(No Model.)

E. PECKHAM.
CAR WHEEL.

No. 375,093. Patented Dec. 20, 1887.

WITNESSES:
C. L. Bendixon
G. Gulowsen

INVENTOR
Edgar Peckham
BY
Duell, Laass & Duell
ATTORNEYS.

UNITED STATES PATENT OFFICE.

EDGAR PECKHAM, OF SYRACUSE, NEW YORK, ASSIGNOR TO THE PECKHAM CAR WHEEL COMPANY, OF SAME PLACE.

CAR-WHEEL.

SPECIFICATION forming part of Letters Patent No. 375,093, dated December 20, 1887.

Application filed August 1, 1887. Serial No. 245,845. (No model.)

*To all whom it may concern:*

Be it known that I, EDGAR PECKHAM, of Syracuse, in the county of Onondaga, in the State of New York, have invented new and useful Improvements in Car-Wheels, of which the following, taken in connection with the accompanying drawings, is a full, clear, and exact description.

This invention relates to car-wheels having a tire detachably secured to the body of the wheel; and the invention consists in improved means for securing the tire to the body of the wheel, as hereinafter fully described, and specifically set forth in the claims.

Figure 1:
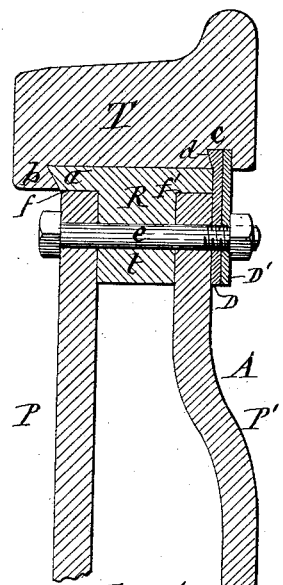
Figure 2:
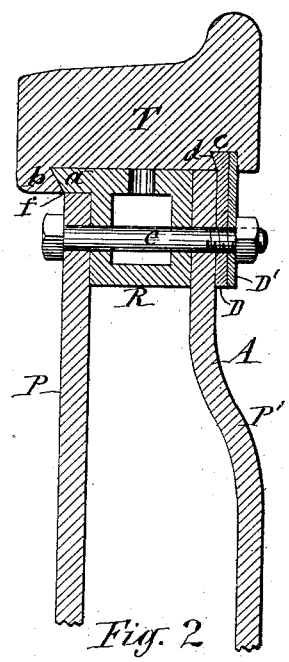
Figure 3:
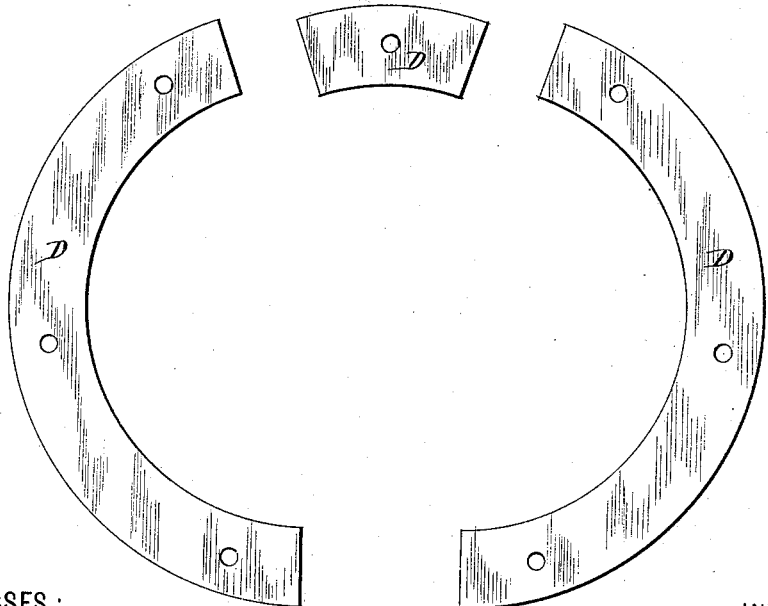

In the accompanying drawings, Figures 1 and 2 are transverse sectional views of my improved tire attachment as applied to wheel-bodies of different constructions, and Fig. 3 is a detached plan view of one of the tire-retaining rings.

Similar letters of reference indicate corresponding parts.

A represents the body of the wheel, and T the tire. Said body I provide on one side, and adjacent to the periphery thereof, with the flange $a$, which is beveled toward the side of the body. When the body is formed with a peripheral ring, R, and web-plates P P', secured to opposite sides of said ring, I form the flange $a$ integral with the ring R, and terminate the bevel of the flange with a shoulder, $f$, around the inner peripheral face of said flange, and make the plate P of a diameter to cause the peripheral edge thereof to abut against the shoulder $f$; and when the ring R is T-shaped in cross-section, as shown in Fig. 1 of the drawings, I make the two plates P P' of the same diameter, so that both abut against the inner peripheral faces, $f$ and $f'$, of the ring at opposite sides of the stem $t$, against which the plates rest.

When the ring R is of the shape shown in Fig. 2 of the drawings, I make the web-plate P' of a diameter to bring its peripheral edge flush with the outer peripheral face of the ring R. The inner peripheral face of the tire T, I form with the undercut flange $b$, around one edge of said face, and with an undercut groove, $c$, near the opposite edge of said face, said flange and groove being a proper distance apart to receive between them the peripheral face of the body A, with the flange $a$ of the latter entered into and interlocked with the flange $b$ of the tire. The tire I lock in its aforesaid position by means of the retaining-rings D D', which are divided transversely into three or more sections to allow them to be inserted into the groove $c$. One of said rings is formed with a beveled enlarged peripheral portion, $d$, fitted to the beveled undercut side of the groove $c$, and the other ring, D', is of a thickness as great, or slightly greater, than the depth of the under-cut of the groove, so that the ring D can be first introduced into the groove and crowded toward the undercut side thereof, and then the ring D' can be inserted into groove to retain the first ring in position.

By means of bolts $e$, passing transversely through the retaining-rings D D' and through the body A, said parts are firmly united, and in the wheel illustrated in Fig. 2 of the drawings said bolts also serve to clamp the web-plates P P' onto the ring R.

In order to obtain a more secure fastening of the tire to the body of the wheel I shrink the tire T onto the body A and onto the retaining-rings D D' by first heating the tire, so as to expand the same, then slipping it in this condition onto the cold body A, so as to abut with the undercut side of the flange $b$ against the beveled edge of the flange $a$, then inserting the cold retaining-rings D D' into the groove $c$ of the heated tire, and then cooling the latter, which by its resultant shrinkage is caused to closely hug the aforesaid body and retaining-rings, and thus firmly unite all of said parts.

Having described my invention, what I claim as new, and desire to secure by Letters Patent, is—

1. The combination of the tire formed with the beveled undercut flange $b$, the ring R, formed with the beveled flange $a$, interlocking with the flange $b$ and terminating with the shoulder $f$, and the web-plate P, abutting with its peripheral edge against said shoulder, substantially as described and shown.

2. In combination with the tire provided near the opposite edges of its peripheral face respectively with the undercut flange $b$ and undercut groove c, the ring R, formed with the beveled flange a, interlocking with the flange b, and provided with the shoulder f, the web-plates P P′, abutting with their peripheral edges, respectively, against the shoulder f and against the inner periphery of the tire, the retaining-rings D D′, locked in the groove c, and the bolt e, securing the retaining-rings and web-plates to the ring R, substantially as described and shown.

In testimony whereof I have hereunto signed my name, in the presence of two witnesses, at Syracuse, in the county of Onondaga, in the State of New York, this 19th day of July, 1887.

EDGAR PECKHAM. [L. S.]

Witnesses:
HOWARD P. DENISON,
C. BENDIXON.